US010562775B2

(12) United States Patent
Ovalle et al.

(10) Patent No.: US 10,562,775 B2
(45) Date of Patent: Feb. 18, 2020

(54) METHOD FOR PRODUCING CARBON NANOTUBE SHEET AND CARBON NANOTUBE SHEET

(71) Applicants: LINTEC CORPORATION, Tokyo (JP); LINTEC OF AMERICA, INC., Phoenix, AZ (US); KINKI UNIVERSITY, Osaka (JP)

(72) Inventors: Raquel Ovalle, Phoenix, AZ (US); Senku Tanaka, Osaka (JP); Kanzan Inoue, Phoenix, AZ (US)

(73) Assignees: Lintec Corporation, Tokyo (JP); Lintec of America, Inc., Phoenix, AZ (US); Kinki University, Osaka (JP)

(*) Notice: Subject to any disclaimer, the term of this patent is extended or adjusted under 35 U.S.C. 154(b) by 0 days.

(21) Appl. No.: 15/527,632

(22) PCT Filed: Nov. 20, 2015

(86) PCT No.: PCT/JP2015/082723
§ 371 (c)(1),
(2) Date: May 17, 2017

(87) PCT Pub. No.: WO2016/080526
PCT Pub. Date: May 26, 2016

(65) Prior Publication Data
US 2017/0362089 A1 Dec. 21, 2017

Related U.S. Application Data

(60) Provisional application No. 62/252,908, filed on Nov. 9, 2015, provisional application No. 62/082,852, filed on Nov. 21, 2014.

(51) Int. Cl.
C01B 32/168 (2017.01)
B32B 9/00 (2006.01)
(Continued)

(52) U.S. Cl.
CPC .............. *C01B 32/168* (2017.08); *B32B 9/00* (2013.01); *B32B 9/04* (2013.01); *B32B 37/14* (2013.01);
(Continued)

(58) Field of Classification Search
CPC ...... C01B 31/022–0293; Y10T 428/30; B82Y 30/00
(Continued)

(56) References Cited

U.S. PATENT DOCUMENTS 7,060,241 B2 6/2006 Glatkowski
8,920,661 B2 12/2014 Jiang et al.
(Continued)

FOREIGN PATENT DOCUMENTS

CN 1543399 A 11/2004
CN 101239712 A 8/2008
(Continued)

OTHER PUBLICATIONS

Qianli Liu et al., "Highly aligned dense carbon nanotube sheets induced by multiple stretching and pressing", Nanoscale, vol. 6, No. 8, pp. 4338-4344 (2014).
(Continued)

Primary Examiner — Daniel H Miller
(74) Attorney, Agent, or Firm — McDermott Will & Emery LLP

(57) ABSTRACT

The present invention provides a method for producing a carbon nanotube sheet that is excellent in light transmittance and conductivity, and the carbon nanotube sheet. The method includes firstly modifying of modifying a free-standing unmodified carbon nanotube sheet in which a plurality of carbon nanotubes are aligned in a predetermined direction. The firstly modifying includes performing a densification process of bringing the unmodified carbon nano-
(Continued)

tube sheet into contact with either one of or both of vapor and liquid particles of a liquid substance to produce a modified carbon nanotube sheet that contains the carbon nanotubes which are mainly aligned in a predetermined direction, and that includes a high density portion where the carbon nanotubes are assembled together and a low density portion where density of the carbon nanotubes is relatively lower than density in the high density portion.

13 Claims, 10 Drawing Sheets

(51) Int. Cl.
 *B32B 9/04* (2006.01)
 *B32B 37/14* (2006.01)
 *B82Y 30/00* (2011.01)
 *B82Y 40/00* (2011.01)

(52) U.S. Cl.
 CPC .............. *B82Y 30/00* (2013.01); *B82Y 40/00* (2013.01); *C01B 2202/08* (2013.01); *C01B 2202/22* (2013.01); *C01P 2006/10* (2013.01); *C01P 2006/60* (2013.01); *Y10S 977/742* (2013.01); *Y10S 977/842* (2013.01); *Y10S 977/932* (2013.01)

(58) Field of Classification Search
 USPC .......................................... 428/408; 423/448
 See application file for complete search history.

(56) References Cited

U.S. PATENT DOCUMENTS

| | | | |
|---|---|---|---|
| 2003/0122111 A1* | 7/2003 | Glatkowski | B82Y 10/00 252/500 |
| 2008/0170982 A1 | 7/2008 | Zhang et al. | |
| 2008/0248235 A1 | 10/2008 | Feng et al. | |
| 2009/0181239 A1 | 7/2009 | Fan et al. | |
| 2011/0111177 A1 | 5/2011 | Hata et al. | |
| 2012/0298618 A1* | 11/2012 | Jiang | C01B 32/186 216/20 |
| 2014/0093694 A1 | 4/2014 | Hata et al. | |
| 2015/0147573 A1 | 5/2015 | Zhang et al. | |
| 2015/0308018 A1 | 10/2015 | Zhang et al. | |

FOREIGN PATENT DOCUMENTS

| | | |
|---|---|---|
| CN | 102796991 A | 11/2012 |
| JP | 2008-523254 A | 7/2008 |
| JP | 2009-167092 A | 7/2009 |
| JP | 2012-246210 A | 12/2012 |
| WO | 2007/015710 A2 | 2/2007 |
| WO | 2009/107846 A1 | 9/2009 |

OTHER PUBLICATIONS

Wei Liu et al., "Producing superior composites by winding carbon nanotubes onto a mandrel under a poly (vinyl alcohol) spray", Carbon, vol. 49, No. 14, pp. 4786-4791(2011).

Qingfeng Liu et al., "Free-Standing Highly Conductive Transparent Ultrathin Single-Walled Carbon Nanotube Films", Journal of the American Chemical Society, vol. 132, No. 46, pp. 16581-16586 (2010).

Extended European Search Report issued in corresponding EP Patent Application No. 15861197.0, dated Apr. 19, 2018.

Search Report issued in corresponding International Patent Application No. PCT/JP2015/082723, dated Dec. 28, 2015.

Taiwanese Office Action issued in corresponding Taiwanese Patent Application No. 104138522, dated Feb. 21, 2019, with English Translation.

Office Action issued in corresponding Chinese Application No. 201580062663.9, dated Jul. 26, 2019, with English translation.

* cited by examiner

METHOD FOR PRODUCING CARBON NANOTUBE SHEET AND CARBON NANOTUBE SHEET

CROSS REFERENCE

This application is the U.S. National Phase under 35 U.S.C. § 371 of International Application No. PCT/JP2015/082723, filed on Nov. 20, 2015, which claims the benefit of U.S. Provisional Application No. 62/252,908, filed on Nov. 9, 2015, and U.S. Provisional Application No. 62/082,852, filed on Nov. 21, 2014, and the entire contents of each are hereby incorporated by reference.

FIELD

The present invention relates to a method for producing a carbon nanotube sheet and the carbon nanotube sheet.

BACKGROUND

A method for producing a carbon nanotube sheet by using a forest of carbon nanotubes has been disclosed (see PCT International Application No. 2007-015710, for example). In the method for producing a carbon nanotube sheet disclosed in PCT International Application No. 2007-015710, carbon nanotubes grown on the surface of a growth substrate by chemical vapor deposition (CVD) are drawn with a jig, and then, the drawn carbon nanotubes in a ribbon shape are arranged on a base to form a carbon nanotube sheet. The carbon nanotube sheet is then infiltrated together with the base into, for example, acetone, for a densification process. The carbon nanotube sheet is thus modified to have increased strength and increased light transmittance.

CITATION LIST

Patent Literature

Patent Literature 1: PCT International Application No. 2007-015710

SUMMARY

Technical Problem

In the method for producing a carbon nanotube sheet disclosed in Patent Literature 1, the carbon nanotube sheet drawn from the forest of carbon nanotubes is arranged on the base and is subjected to a densification process. This configuration may inhibit the carbon nanotubes from assembling due to the interaction between the base and the carbon nanotubes, and the strength and the light transmittance may not be sufficiently increased. In addition, a modified carbon nanotube sheet may adhere to the base, and it may be difficult to separate the modified carbon nanotube sheet from the base.

The present invention provides a method for producing a carbon nanotube sheet that is excellent in light transmittance and conductivity, and the carbon nanotube sheet.

Solution to Problem

A method for producing a carbon nanotube sheet of the present invention, the method comprising: firstly modifying of modifying a free-standing unmodified carbon nanotube sheet in which a plurality of carbon nanotubes are aligned in a predetermined direction, wherein the firstly modifying includes performing a densification process of bringing the unmodified carbon nanotube sheet into contact with either one of or both of vapor and liquid particles of a liquid substance to produce a modified carbon nanotube sheet that contains the carbon nanotubes which are mainly aligned in a predetermined direction, and that includes a high density portion where the carbon nanotubes are assembled together and a low density portion where density of the carbon nanotubes is relatively lower than density in the high density portion.

In the method for producing a carbon nanotube sheet according to the present invention, further comprising: stacking at least two layers of the modified carbon nanotube sheets to prepare a stacked assembly of the carbon nanotube sheets; and secondly modifying the stacked assembly by a densification process in which the stacked assembly in a free-standing state is brought into contact with either one of or both of vapor and liquid particles of the liquid substance.

According to the method for producing a carbon nanotube sheet, the unmodified carbon nanotube sheet is brought into contact with a liquid substance in a free-standing state for a densification process. This process can efficiently assemble the carbon nanotubes. For example, the modified carbon nanotube sheet excellent in light transmittance and conductivity can be obtained, in which the light transmittance is 70% or more and the resistance is 500 Ω/square or less.

In the method for producing a carbon nanotube sheet according to the present invention, wherein at the stacking step, the stacked assembly of the carbon nanotube sheets is prepared by stacking 2 to 25 layers of the modified carbon nanotube sheets.

In the method for producing a carbon nanotube sheet according to the present invention, wherein the liquid particles have a size of 200 µm or smaller.

In the method for producing a carbon nanotube sheet according to the present invention, wherein the liquid particles are formed as either one of or both of an aerosol of the liquid substance and the liquid substance ejected by ink-jetting.

In the method for producing a carbon nanotube sheet according to the present invention, wherein the liquid substance is an organic solvent.

In the method for producing a carbon nanotube sheet according to the present invention, wherein the organic solvent is an alcohol compound.

In the method for producing a carbon nanotube sheet according to the present invention, wherein the alcohol compound is at least one selected from the group consisting of methanol, ethanol, and isopropyl alcohol.

A carbon nanotube sheet of the present invention, the carbon nanotube produced by the above method for producing a carbon nanotube sheet.

According to the carbon nanotube sheet, the carbon nanotube is produced by a densification process that the unmodified carbon nanotube sheet is brought into contact with a liquid substance in a free-standing state. This process can efficiently assemble the carbon nanotubes. For example, the modified carbon nanotube sheet excellent in light transmittance and conductivity can be obtained, in which the light transmittance is 70% or more and the resistance is 500 Ω/square or less.

In the carbon nanotube sheet according to the present invention, wherein the carbon nanotube sheet has a light transmittance of 70% or more.

In the carbon nanotube sheet according to the present invention, wherein the carbon nanotube sheet has a resistance of 500 Ω/square or less.

In the carbon nanotube sheet according to the present invention, wherein the carbon nanotube sheet has the light transmittance of 70% or more and a resistance of 500 Ω/square or less.

A carbon nanotube sheet of the present invention, the carbon nanotube comprising: a plurality of carbon nanotubes mainly aligned in a predetermined direction, wherein the carbon nanotube sheet includes a plurality of high density portions in each of which the carbon nanotubes are assembled together in a fibrous form, and a plurality of low density portions in each of which density of the carbon nanotubes is relatively lower than density in the high density portions, and the carbon nanotube sheet has a light transmittance of 70% or more and a resistance of 500 Ω/square or less.

According to the carbon nanotube sheet, By the carbon nanotube sheet includes a plurality of high density portions in each of which the carbon nanotubes mainly aligned in a predetermined direction, and a plurality of low density portions in each of which density of the carbon nanotubes is relatively lower than density in the high density portions, the carbon nanotube sheet can efficiently assemble the carbon nanotubes. For example, the modified carbon nanotube sheet excellent in light transmittance and conductivity can be obtained, in which the light transmittance is 70% or more and the resistance is 500 Ω/square or less.

In the carbon nanotube sheet according to the present invention, wherein the plurality of high density portions include linear assemblies each containing the carbon nanotubes and the linear assemblies are aligned in parallel, and each of the plurality of low density portions is provided between the plurality of high density portions.

DESCRIPTION OF EMBODIMENTS

Embodiments of the present invention are described in detail below with reference to the accompanying drawings. The embodiments below are not intended to limit the present invention and may be appropriately changed to be practiced. The embodiments may also be practiced in any of appropriate combinations. It should be noted that in the embodiments, like numerals refer to like components and duplicated descriptions are omitted.

Figure 1A:
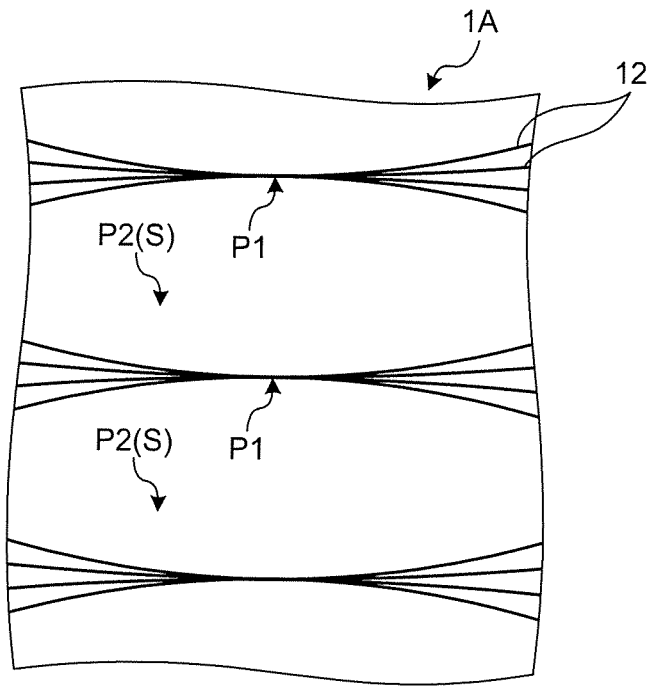
FIG. 1A is a schematic plan view of an example carbon nanotube sheet according to a first embodiment of the present invention.
Figure 1B:
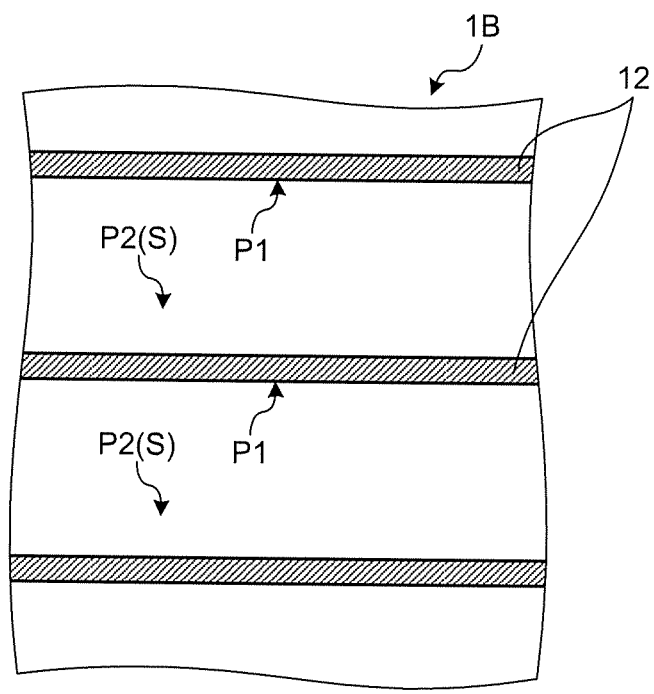
FIG. 1B is a schematic plan view of an example carbon nanotube sheet according to a second embodiment of the present invention.

An outline of carbon nanotube sheets according to the respective embodiments is described below. FIG. 1A is a schematic plan view of an example carbon nanotube sheet 1A according to a first embodiment of the present invention. FIG. 1B is a schematic plan view of an example carbon nanotube sheet 1B according to a second embodiment of the present invention.

As illustrated in FIG. 1A, the carbon nanotube sheet 1A according to the first embodiment of the present invention contains a plurality of carbon nanotubes 12 in such a manner that the carbon nanotubes 12 are mainly aligned in a predetermined direction. The carbon nanotube sheet 1A includes high density portions P1 in each of which the carbon nanotubes 12, which are arranged adjacent to one another and substantially in parallel, are assembled together at the middle part, and low density portions P2 in each of which the density of the carbon nanotubes 12 is relatively lower than the density in the high density portion P1. Both end portions of the carbon nanotubes 12 have a density between that in the high density portion P1 and that in the low density portion P2. The definition of a state that the carbon nanotubes 12 are mainly aligned in a predetermined direction is a state in which the number of carbon nanotubes 12 aligned in the predetermined direction is larger than the number of carbon nanotubes 12 aligned in another direction different from the predetermined direction.

Figure 3:
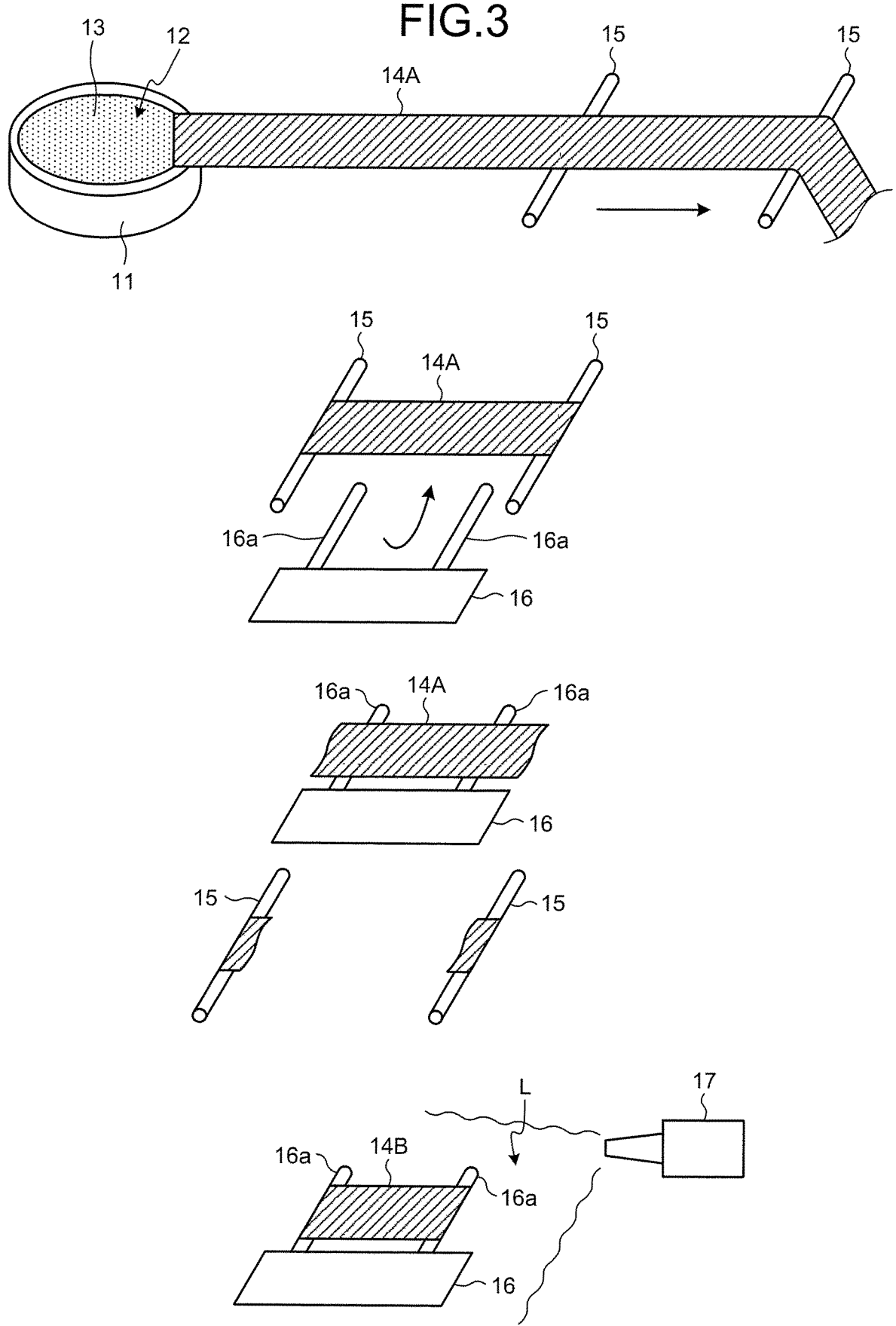
FIG. 3 is a diagram illustrating the method for producing a carbon nanotube sheet according to the embodiment of the present invention.

In the example illustrated in FIG. 1A, the high density portion P1 is provided by assembling together, by a certain densification process, the carbon nanotubes 12 that are contained in an unmodified carbon nanotube sheet 14A (not illustrated in FIG. 1A, refer to FIG. 3) drawn from a carbon nanotube forest 13 (not illustrated in FIG. 1A, refer to FIG. 3). The low density portion P2 is provided between the high density portions P1 as a space S where the carbon nanotubes 12 are moved away by the densification process and thus not present. In this manner, the carbon nanotube sheet 1A can have increased conductivity by having the high density portions A1 of the carbon nanotubes 12, and can have an increased light transmittance by having the low density portions A2, compared to a case where the carbon nanotubes 12 are uniformly present in its surface.

As illustrated in FIG. 1B, the carbon nanotube sheet 1B according to the second embodiment of the present invention includes high density portions A1 in each of which a plurality of carbon nanotubes 12 are twisted and assembled together in a fibrous form, and low density portions A2 in each of which the density of the carbon nanotubes 12 is relatively lower than the density in the high density portion A1. In addition, the carbon nanotube sheet 1B contains the carbon nanotubes 12 in such a manner that the carbon nanotubes 12 are mainly aligned in a predetermined direction.

In the example illustrated in FIG. 1B, the high density portion 91 is provided as a linear assembly containing the carbon nanotubes 12 formed in a yarn or ribbon shape. Such linear assembly can be obtained as a linear assembly of the carbon nanotubes 12 assembled together in a fibrous form obtained by, for example, twisting the carbon nanotubes 12 that are contained in the unmodified carbon nanotube sheet 14A (not illustrated in FIG. 1B, refer to FIG. 3) drawn from the carbon nanotube forest 13 (not illustrated in FIG. 1B, refer to FIG. 3). The linear assembly of the carbon nanotubes 12 assembled together in a fibrous form may be a yarn shaped linear assembly that is a yarn obtained by twining the carbon nanotubes 12, or may be a ribbon shaped linear assembly obtained by assembling together the carbon nanotubes 12 by friction or other means without twining the carbon nanotubes 12. That is, the high density portion 91 constituted of the carbon nanotubes 12 is obtained as the yarn shaped linear assembly when the carbon nanotubes 12 are twined into a yarn, and is obtained as the ribbon shaped linear assembly when the carbon nanotubes 12 are not twined. The ribbon shaped linear assembly of the carbon nanotubes 12 does not have a structure in which the carbon nanotubes 12 are twined. Alternatively, the high density portion P1 may be obtained as a linear assembly containing the carbon nanotubes 12 formed in a yarn shape by being spun from dispersion of the carbon nanotubes 12. As the linear assembly of the carbon nanotubes 12, in view of increasing the uniformity of the thickness of the linear assembly, a linear assembly containing the carbon nanotubes 12 in a yarn shape is preferable. In view of increasing the purity of the carbon nanotubes 12 in the linear assembly, a linear assembly obtained by twisting the carbon nanotubes 12 is preferable.

The high density portions P1 are provided in such a manner that a plurality of linear assemblies of the carbon nanotubes 12 are aligned substantially in parallel with a certain distance therebetween. The low density portions P2 are each provided as the space S which is in between the linear assemblies of the carbon nanotubes 12 and where the carbon nanotubes 12 are not present between the high density portions P1. In this manner, the carbon nanotube sheet 1B can have increased conductivity by having the high density portions A1 of the carbon nanotubes 12, and can have an increased light transmittance by having the low density portions A2, compared to a case where the carbon nanotubes 12 are uniformly present in its surface. Methods for producing carbon nanotubes according to the first embodiment and the second embodiment described above are described below in more detail.

First Embodiment

Figure 2:
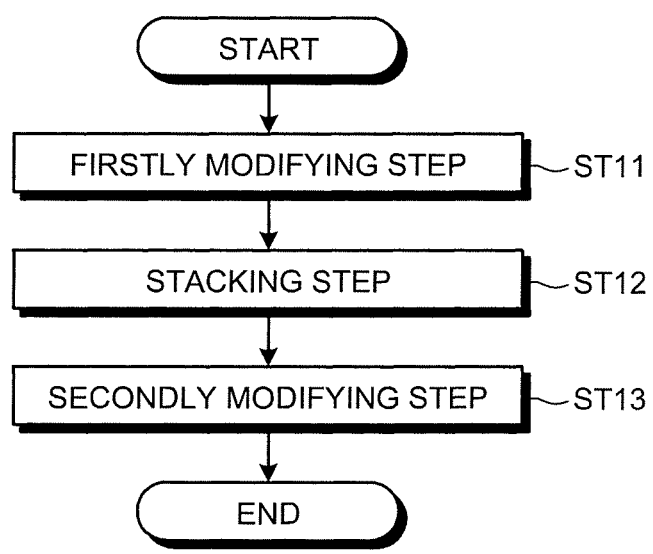
FIG. 2 is a flow chart of a method for producing a carbon nanotube sheet according to the first embodiment of the present invention.

FIG. 2 is a flow chart of a method for producing a carbon nanotube sheet according to the first embodiment. As illustrated in FIG. 2, the method for producing a carbon nanotube sheet according to the present embodiment includes a firstly modifying step ST11, a stacking step ST12, and a secondly modifying step ST13. In the firstly modifying step ST11, a free-standing unmodified carbon nanotube sheet in which a plurality of carbon nanotubes are aligned in a predetermined direction is modified by a densification process in which the unmodified carbon nanotube sheet is brought into contact with either one of or both of vapor and liquid particles of a liquid substance to produce a modified carbon nanotube sheet that includes a high density portion P1 where a plurality of carbon nanotubes 12 are assembled together and a low density portion P2 where the density of the carbon nanotubes 12 is relatively lower than the density in the high density portion P1. In the stacking step ST12, at least two layers of the modified carbon nanotube sheets are stacked, or at least one layer of the unmodified carbon nanotube sheet is stacked on the modified carbon nanotube sheet, to prepare a stacked assembly of the carbon nanotube sheets. In the secondly modifying step ST13, the stacked assembly is modified by a densification process in which the stacked assembly is brought into contact with either one of or both of vapor and liquid particles of the liquid substance. The stacking step ST12 and the secondly modifying step ST13 are not necessarily practiced and are appropriately practiced depending on properties of a carbon nanotube sheet to be produced. The method for producing a carbon nanotube sheet according to the present embodiment is described below in more detail.

<Firstly Modifying Step>

FIG. 3 is a diagram illustrating the method for producing a carbon nanotube sheet according to the present embodiment. In the firstly modifying step ST11, the unmodified carbon nanotube sheet 14A in which a plurality of carbon nanotubes 12 are aligned in a predetermined direction (hereinafter, also simply called the "unmodified carbon nanotube sheet 14A") is prepared. As illustrated in FIG. 3, in an example of a method for producing the unmodified carbon nanotube sheet 14A, the carbon nanotubes 12 are drawn from the carbon nanotube forest 13 in which a large number of carbon nanotubes 12 stand in rows on a substrate 11 such as a silicon wafer, by using a pair of supporting bars (supporting bodies) 15. In doing so, the carbon nanotubes 12 forming an assembly in a ribbon shape are obtained. The carbon nanotubes 12 are drawn from the carbon nanotube forest 13 and thus are aligned so that the axis directions of their cylindrical shapes mainly approach the drawing direction. The drawn carbon nanotubes 12 are then cut into a desired size to obtain the unmodified carbon nanotube sheet 14A. In this case, the carbon nanotubes 12 are mainly aligned in one direction in a surface of the carbon nanotube sheet 14A. The supporting bars 15 are not limited so long as they can draw the carbon nanotubes 12, and examples thereof include bars made of various kinds of resin materials. A condition for drawing the carbon nanotubes 12 is not limited. The carbon nanotubes 12 are preferably drawn as the unmodified carbon nanotube sheet 14A in a condition under ordinary pressure at a temperature of −20° C. to 500° C.

Subsequently, at the firstly modifying step ST11, the obtained unmodified carbon nanotube sheet 14A is transferred from the pair of supporting bars 15 onto a jig 16 having a pair of supporting units 16a and is held. Either one of or both of vapor and liquid particles of a liquid substance L are then dispersed in air by a spray 17. The unmodified carbon nanotube sheet 14A held by the jig 16 in a free-standing state is brought into contact with the dispersed liquid substance L, for a densification process. In this process, the carbon nanotubes 12 constituting the unmodified carbon nanotube sheet 14A are mutually aggregated and turned into a carbon nanotube sheet 14B that is modified (hereinafter, also simply called the "modified carbon nanotube sheet 14B"). This process can thus increase the strength, the conductivity, and the light transmittance of the modified carbon nanotube sheet 14B. The spray 17 may spray the liquid substance L, for example, at ordinary temperature and pressure, but this is not a limiting example. The spray 17 is not limited so long as it can generate vapor of the liquid substance L or spray the liquid substance L in a state of liquid particles. In the present invention, the free-standing state indicates a state where the carbon nanotubes 12 are held, for example, between the pair of supporting units 16a of the jig 16 without being arranged on a base. When the unmodified carbon nanotube sheet 14A in a free-standing state is brought into contact with either one of or both of vapor and liquid particles of the liquid substance L, the free-standing state need not be maintained in the entire region of the unmodified carbon nanotube sheet 14A, and a part of the region may be held by a holding body.

Figure 4A:
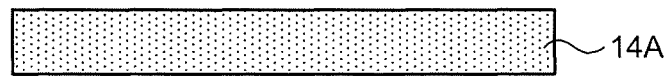
FIG. 4A is a diagram illustrating the method for producing a carbon nanotube sheet according to the embodiment of the present invention.
Figure 4B:
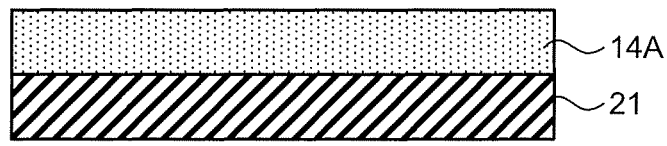
FIG. 4B is a diagram illustrating a conventional method for producing a carbon nanotube sheet.

FIG. 4A is a diagram illustrating the method for producing a carbon nanotube sheet according to the present embodiment, and FIG. 4B is a diagram illustrating a conventional method for producing a carbon nanotube sheet. As illustrated in FIG. 4A, in the present embodiment, the unmodified carbon nanotube sheet 14A is held by the jig 16 (not shown in FIG. 4A, see FIG. 3) and a densification process is performed thereon in a free-standing state, as described above. In contrast, as illustrated in FIG. 4B, in the conventional method for producing a carbon nanotube sheet, the unmodified carbon nanotube sheet 14A is infiltrated into a liquid substance such as acetone, so that a densification process needs to be performed on the sheet in a state of being fixed on a base 21. In the present embodiment, a densification process is performed in a free-standing state and thus can be efficiently performed on the unmodified carbon nanotube sheet 14A free of influence from the interaction between the base 21 and the carbon nanotubes 12 constituting the unmodified carbon nanotube sheet 14A.

Figure 5:
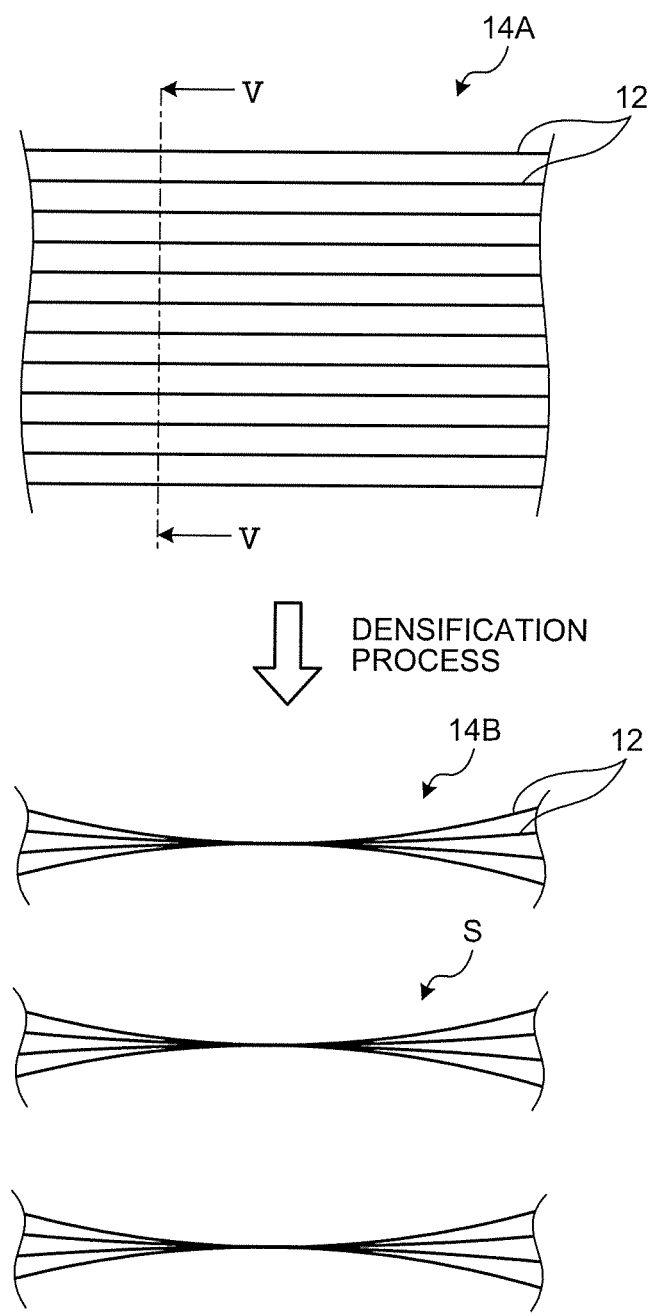
FIG. 5 is a conceptual diagram of the method for producing a carbon nanotube sheet according to the embodiment of the present invention.
Figure 6:
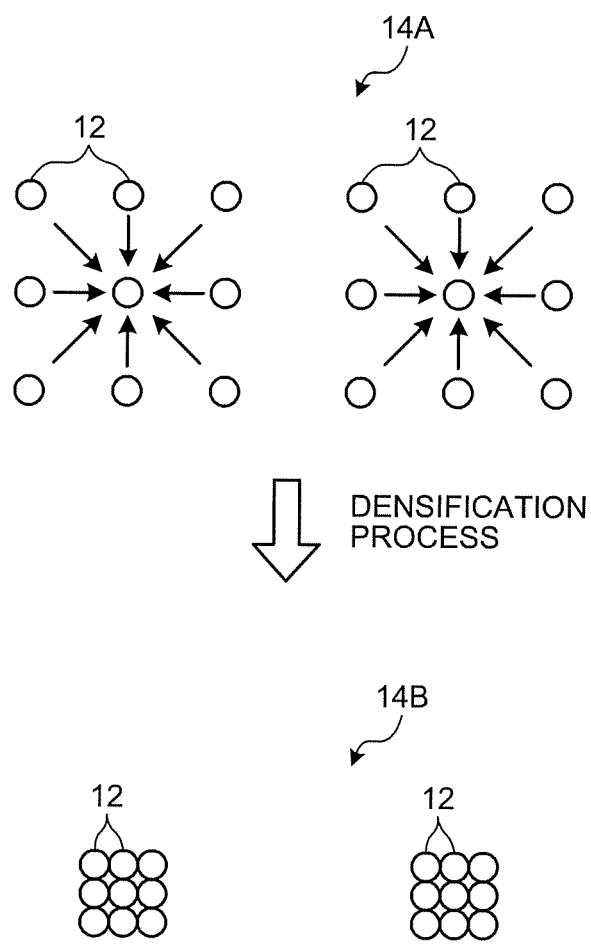
FIG. 6 is a conceptual diagram of the method for producing a carbon nanotube sheet according to the embodiment of the present invention.

FIGS. 5 and 6 are conceptual diagrams of the method for producing a carbon nanotube sheet according to the present embodiment. FIG. 6 schematically illustrated in a section viewed along a line V-V in FIG. 5. As illustrated in FIGS. 5 and 6, in the present embodiment, a densification process is performed in a free-standing state where the unmodified carbon nanotube sheet 14A in which the carbon nanotubes 12 are aligned substantially in parallel is not held by a base or the like. In this state, the carbon nanotubes 12 assembled together without being entangled with one another, so that the carbon nanotubes 12 can be bundled to be congested (hereinafter, this phenomenon may be called "bundling"). The carbon nanotubes 12 are congested to increase the number of contact points between the carbon nanotubes 12 while maintaining the main alignment in the predetermined direction of the carbon nanotube sheet 14A, which results in the increase in the strength and the conductivity of the modified carbon nanotube sheet 14B. In addition, the space S is formed between the congested carbon nanotubes 12 of the bundle, which results in the increase in the light transmittance of the modified carbon nanotube sheet 14B. Consequently, the modified carbon nanotube sheet 14B excellent in conductivity and light transmittance can be obtained.

By contrast, when the liquid particles of the liquid substance L are sprayed on the carbon nanotube sheet 14A on the base 21, as illustrated in FIG. 4B, for a densification process, the carbon nanotubes 12 are inhibited from assembling together due to the interaction between the carbon nanotubes 12 and the base 21. The carbon nanotubes 12 are thus not bundled, and the modified carbon nanotube sheet 14B excellent in conductivity and light transmittance cannot be obtained. Furthermore, the modified carbon nanotube sheet 14B after the densification process tends to increase in the adhesiveness to the base 21, so that a device, for example, is required for peeling the modified carbon nanotube sheet 14B from the base 21. In addition, in a densification process in which the unmodified carbon nanotube sheet 14A is infiltrated into the liquid substance L, the carbon nanotubes 12 in a free-standing state collapse. It is thus necessary to fix the carbon nanotubes 12 on a base. With this configuration, also when the carbon nanotubes 12 are infiltrated into the liquid substance L, the carbon nanotubes 12 are inhibited from assembling together due to the interaction between the carbon nanotubes 12 and the base 21. The modified carbon nanotube sheet 14B excellent in conductivity and light transmittance can thus not be obtained.

The liquid substance L at the firstly modifying step ST11 is not limited so long as it is a substance that becomes a liquid at ordinary temperature (25° C., for example) and may be any of water and various kinds of organic solvents in the scope of the effects of the present invention. Among these, organic solvents are preferred from the view point of having high affinity with the carbon nanotubes 12, efficiently assembling together the carbon nanotubes 12, and volatilizing immediately after the assembling of the carbon nanotubes 12. The organic solvents are preferably alcohol compounds having a carbon number of 1 to 6, such as methanol, ethanol, n-propyl alcohol, isopropyl alcohol, n-butyl alcohol, s-butyl alcohol, pentyl alcohol, and hexyl alcohol. Among these, in view of allowing reduction in environmental loads and of easy handling, at least one organic solvent selected from the group consisting of methanol, ethanol, and isopropyl alcohol is preferably used.

At the firstly modifying step ST11, the liquid particles of the liquid substance L have a size (particle diameter) of preferably, 200 μm or smaller. With this size, the liquid substance L can be efficiently sprayed on the carbon nanotubes 12, so that the conductivity and the light transmittance of the modified carbon nanotube sheet 14B can be further increased. The liquid particles have a size of preferably, 5 nm or larger, more preferably, 7.5 nm or larger, and further preferably, 10 nm or larger and also of preferably, 200 μm or smaller, more preferably, 100 μm or smaller, and further preferably, 50 μm or smaller. In consideration of this, the liquid particles have a size of preferably, 5 nm or larger and 200 μm or smaller, more preferably, 7.5 nm or larger and 100 μm or smaller, and further preferably, 10 nm or larger and 50 μm or smaller.

The particle diameter of the liquid substance L can be measured, for example, with an optical microscope (trade name: Ultra-High Magnification USB Microscope CCD SH140CCD-R (3W), manufactured by Shodensha, Inc.). For example, an image of the liquid particle of the liquid substance L is taken in air at room temperature and is recorded. The recorded image is analyzed to measure the particle diameter on a carbon nanotube sheet 14. In the present invention, the particle diameter employs the mean of the particle diameters of twenty liquid particles randomly sampled.

The liquid particles of the liquid substance L are preferably formed as either one of or both of an aerosol of the liquid substance L and the liquid substance L ejected by ink-jetting. With this size, the liquid substance L can be efficiently sprayed on the carbon nanotubes 12, so that the conductivity and the light transmittance of the modified carbon nanotube sheet 14B can be further increased.

The firstly modifying step ST11 is not limited so long as the unmodified carbon nanotube sheet 14A can be exposed to liquid particles of the liquid substance L ejected by ink-jetting or an aerosol of the liquid substance L and can employ a conventionally known production technique. At the firstly modifying step ST11, vapor or an aerosol is preferably used. This method can modify a larger number of unmodified carbon nanotube sheets 14A all together than the case by ink-jetting, and the production efficiency increases in the production of the modified carbon nanotube sheet 14B in a batch system. At the firstly modifying step ST11, liquid particles of the liquid substance L ejected by ink-jetting are also preferably used. This method can successively modify the unmodified carbon nanotube sheets 14A by reeling off the produced modified carbon nanotube sheets 14B in succession. In the case of ink-jetting, liquid particles can be ejected onto the unmodified carbon nanotube sheet 14A partially in planar view. In doing so, bundling can be caused only at the portion where the liquid particles are ejected. A selective densification process is thus easily performed on the region in planar view.

After the modification at the firstly modifying step ST11, the modified carbon nanotube sheet 14B can have increased conductivity and a light transmittance of 70% or more. For example, the modified carbon nanotube sheet 14B suitably used as a transparent conductive film can be obtained. The light transmittance of the modified carbon nanotube sheet 14B is preferably, 70% or more and more preferably, 80% or more. The light transmittance of the unmodified carbon nanotube sheet 14A may fluctuate depending on the production condition. However, through the firstly modifying step ST11, the light transmittance of the modified carbon nanotube sheet 14B tends to increase to a high level irrespective of the light transmittance of the unmodified carbon nanotube sheet 14A. Thus, the modified carbon nanotube sheet 14B having such a high light transmittance can be obtained through the firstly modifying step ST11.

Figure 7:
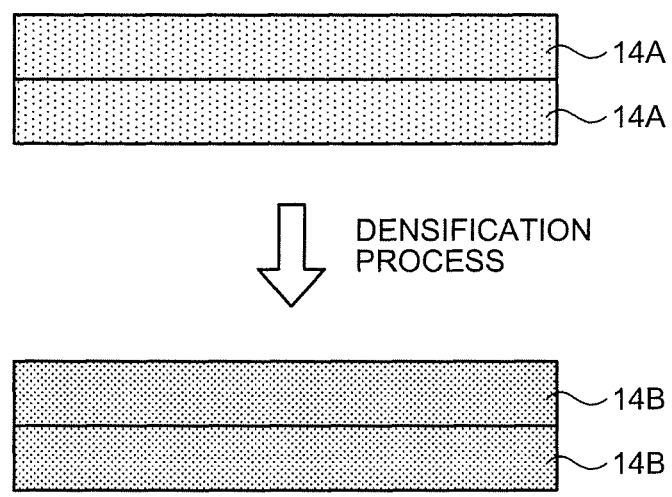
FIG. 7 is a diagram of an example of a firstly modifying step according to the embodiment of the present invention.

FIG. 7 is a diagram of an example of the firstly modifying step ST11 according to the present embodiment. As illustrated in FIG. 7, at the firstly modifying step ST11, two to four of the unmodified carbon nanotube sheets 14A may be stacked and subjected to a densification process to obtain the modified carbon nanotube sheets 14B. In this example, the modified carbon nanotube sheets 14B can be obtained in a state where two or more of the carbon nanotube sheets 14A are stacked, so that the strength and the conductivity of the obtained modified carbon nanotube sheets 14B are further increased.

<Stacking Step>

At the stacking step ST12, at least two layers of the modified carbon nanotube sheets 14B are stacked to prepare a stacked assembly of the modified carbon nanotube sheets 14B. Alternatively, at the stacking step ST12, at least two layers of the modified carbon nanotube sheets 14B may be stacked on one or more layers of the unmodified carbon nanotube sheets 14A to prepare a stacked assembly of the carbon nanotube sheets 14A and 14B. In view of keeping the light transmittance of a stacked assembly 32 obtained after the secondly modifying step ST13 at high level, the number of unmodified carbon nanotube sheets 14A included in such stacked carbon nanotube sheets 14 is preferably, 4 or smaller and more preferably, 2 or smaller, and further preferably, 0. At the stacking step ST12, for example, a stacked assembly of both unmodified carbon nanotube sheets 14B can be obtained as follows: the firstly modifying step ST11 is performed on an unmodified carbon nanotube sheet 14A that has been drawn from the carbon nanotube forest 13 and is held by the jig 16; the firstly modifying step ST11 is performed on another unmodified carbon nanotube sheet 14A that has been drawn from the carbon nanotube forest 13 and is held by the jig 16; and the latter sheet is stacked on the former sheet. The modified carbon nanotube sheets 14B to be used at the stacking step ST12 may be those obtained by performing a densification process on two to four of stacked unmodified carbon nanotube sheets 14A. However, the modified carbon nanotube sheets 14B are preferably those obtained by performing a densification process without stacking any unmodified carbon nanotube sheets 14A. With this operation, the effects of increasing the conductivity, the light transmittance, and the strength of the stacked assembly 32 of the modified carbon nanotube sheets 14B can be obtained more efficiently at the secondly modifying step ST13 described later.

At the stacking step ST12, the direction in which the carbon nanotubes 12 of one of the carbon nanotube sheets 14 to be stacked are aligned and the direction in which the carbon nanotubes 12 of the other of the carbon nanotube sheets 14 are aligned are preferably oriented in substantially the same direction. For example, when the carbon nanotube sheets 14 drawn from the carbon nanotube forest 13 are obtained, the drawing direction of one of the carbon nanotube sheets 14 and the drawing direction of the other of the carbon nanotube sheets 14 are preferably oriented in substantially the same direction. With this operation, the directions of the carbon nanotubes 12 are oriented into the same direction between the carbon nanotube sheets 14. Thus, the light transmittance, the strength, and the conductivity of the stacked assembly of the carbon nanotube sheets 14 can be increased. The substantially the same direction herein includes displacements in the orientation directions of the carbon nanotubes 12, between each of the layers, in the scope of the effects of the present invention. More specifically, the displacements between each of the layers in the orientation directions are preferably within a range of 15° or smaller, more preferably within a range of 10° or smaller, and further preferably within a range of 5° or smaller.

<Secondly Modifying Step>

At the secondly modifying step ST13, the stacked assembly of the modified carbon nanotube sheet 14B obtained at the stacking step ST12 is modified by a densification process in which the stacked assembly in a free-standing state is brought into contact with either one of or both of vapor and liquid particles of the liquid substance L that is generated by the spray 17 or the like to obtain the stacked assembly of the modified carbon nanotube sheet 14B. The liquid substance L used may be the same as that at the firstly modifying step ST11. The particle diameter of the liquid substance L may be in the same condition as that at the firstly modifying step ST11. Furthermore, the spray 17 can spray the liquid substance L in the same condition as that at the firstly modifying step ST11.

Figure 8:
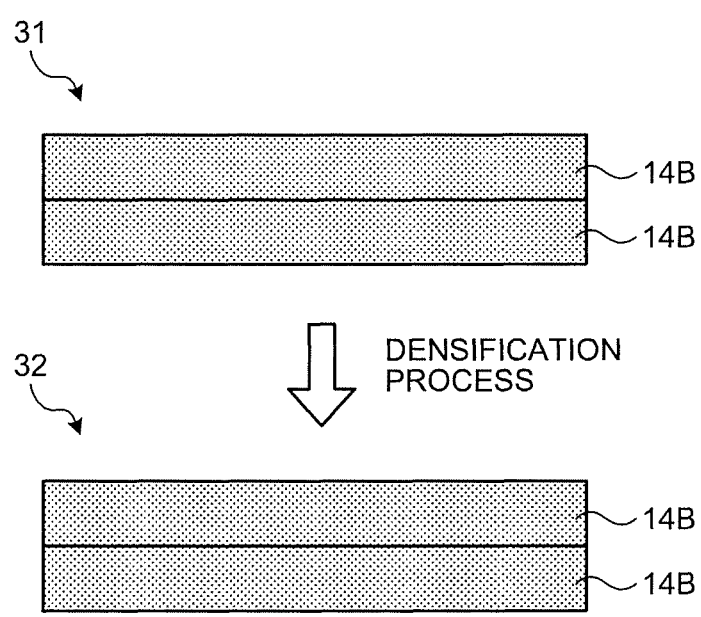
FIG. 8 is a diagram of an example of a secondly modifying step according to the embodiment of the present invention.

FIG. 8 is a diagram of an example of the secondly modifying step ST13 according to the present embodiment. As illustrated in FIG. 8, at the secondly modifying step ST13, a stacked assembly 31 in which at least two layers of the modified carbon nanotube sheets 14B are stacked at the stacking step ST12 may be collectively further modified to be the stacked assembly 32 by a densification process with either one of or both of vapor and liquid particles of the liquid substance L. With this operation, the carbon nanotubes 12 efficiently assemble together as compared with the case where the stacked unmodified carbon nanotube sheets 14A are modified. The conductivity, the light transmittance, and the strength of the stacked assembly 32 of the stacked modified carbon nanotube sheets 14B are further increased. At the secondly modifying step ST13, a densification process may be performed also on a stacked assembly in which the unmodified carbon nanotube 14A and the modified carbon nanotube 14B are stacked.

At the secondly modifying step ST13, a stacked assembly 32 is used in which the number of layers of the modified carbon nanotube sheets 14B stacked at the stacking step ST12 is preferably, 25 or smaller and more preferably, 20 or smaller. The lower limit of the number of layers stacked is preferably, 2 or larger and more preferably, 4 or larger. This structure prevents the stacked assembly 32 of the modified carbon nanotube sheets 14B from increasing in the thickness and easily provides high conductivity with a resistance (sheet resistance) of 500 Ω/square or less and a high light transmittance of a light transmittance of 70% or more. For example, this structure raises the possibility of obtaining the stacked assembly 32 of the modified carbon nanotube sheets 14B that can be suitably used as a transparent electrode. A stacked assembly of the modified carbon nanotube sheets 14B may also be obtained by alternately repeating the stacking step ST12 and the secondly modifying step ST13.

The resistance of the stacked assembly 32 is preferably, 500 Ω/square or less, more preferably, 400 Ω/square or less, further preferably, 300 Ω/square or less, and particularly preferably, 200 Ω/square or less. The resistances of the unmodified carbon nanotube sheets 14A and the modified carbon nanotube sheets 14B may fluctuate depending on the production conditions of the unmodified carbon nanotube sheets 14A. The resistances, however, prominently decrease in accordance with the increase in the number of layers stacked. A stacked assembly with such a low resistance can be thus obtained by increasing the number of layers stacked. The light transmittance of the stacked assembly 32 is preferably, 70% or more and more preferably, 80% or more.

As described above, according to the embodiment above, the unmodified carbon nanotube sheet 14A is brought into contact with a liquid substance in a free-standing state for a densification process. This process can efficiently assemble the carbon nanotubes 12. For example, the modified carbon nanotube sheet 14B excellent in light transmittance and conductivity can be obtained, in which the light transmittance is 70% or more and the resistance is 500 Ω/square or less. The light transmittance of the modified carbon nanotube sheet 14B can be measured, for example, using optical transmittance obtained with a visible-to-ultraviolet light source (trade name: L10290, manufactured by Hamamatsu Photonics K.K.) and a spectroscope (trade name: USB2000, manufactured by Ocean Optics, Inc.). In the present invention, the light transmittance is calculated as the mean of transmittances in a visible light region (380 nm to 760 nm).

Second Embodiment

The second embodiment of the present invention is described below. It should be noted that, in the following, different points from the above-described first embodiment are mainly described and duplicated descriptions are omitted.

Figure 9:
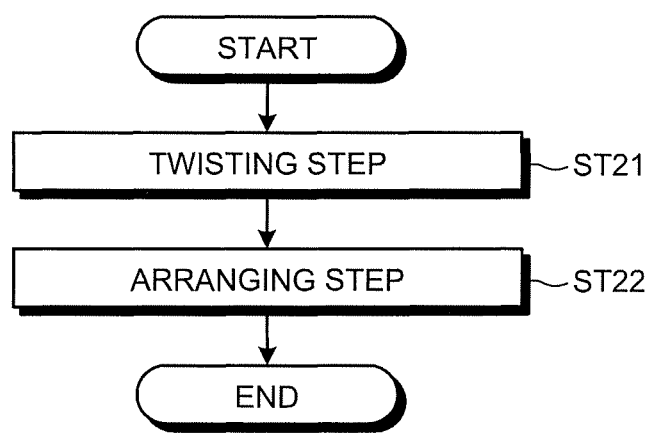
FIG. 9 is a flow chart of a method for producing a carbon nanotube sheet according to the second embodiment of the present invention.

FIG. 9 is a flow chart of an example method for producing a carbon nanotube sheet according to the second embodiment of the present invention. As illustrated in FIG. 9, the method for producing a carbon nanotube sheet according to the present embodiment includes a twisting step ST21 and an arranging step ST22. In the twisting step ST21, the free-standing unmodified carbon nanotube sheet 14A in which the carbon nanotubes 12 are aligned in a predetermined direction is twisted to obtain a linear assembly of the carbon nanotubes 12 in which the carbon nanotubes 12 are assembled together in a fibrous form. In the arranging step ST22, linear assemblies of the carbon nanotubes 12 are aligned substantially in parallel to obtain a carbon nanotube sheet 14 including the high density portions in each of which the yarn shaped carbon nanotubes 12 are provided, and the low density portions in each of which the density of the carbon nanotubes 12 is relatively lower than the density in the high density portion.

Figure 10A:
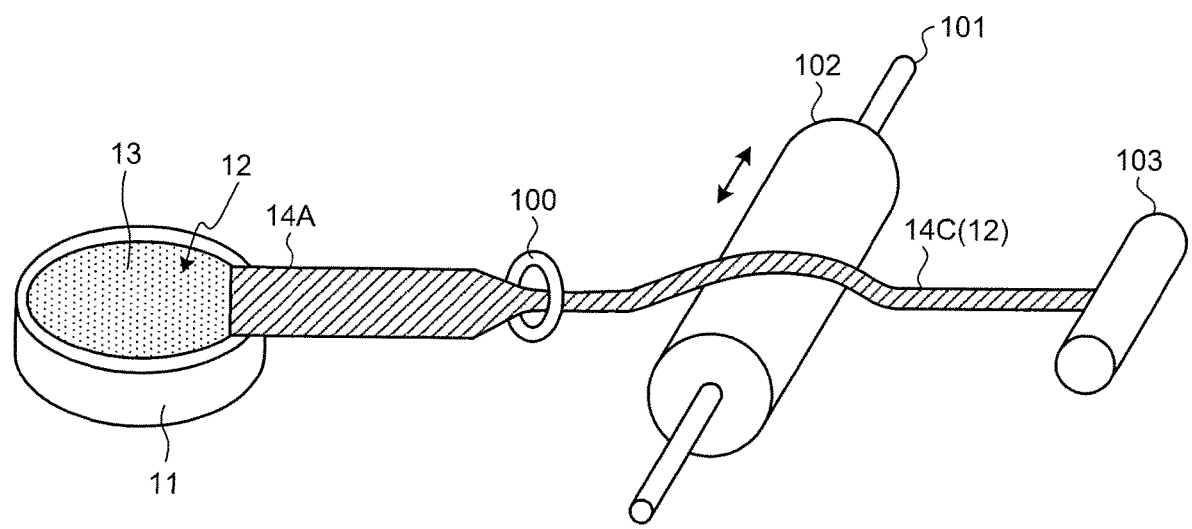
FIG. 10A is a diagram illustrating a twisting step in the method for producing a carbon nanotube sheet according to the embodiment of the present invention.
Figure 10B:
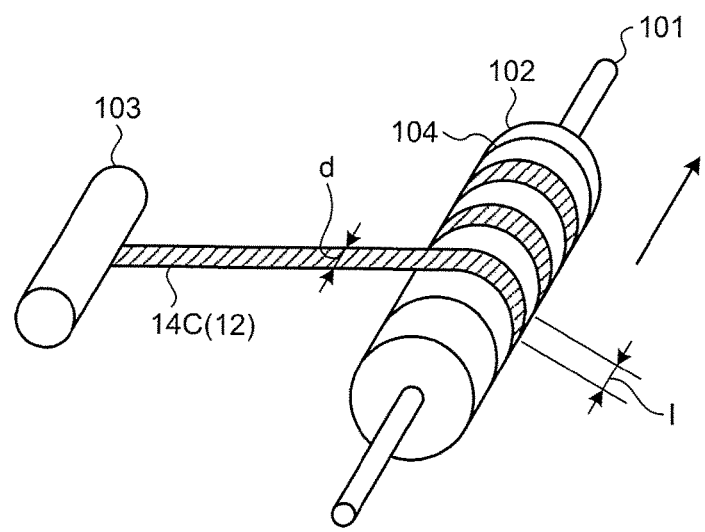
FIG. 10B is a diagram illustrating an arranging step in the method for producing a carbon nanotube sheet according to the embodiment of the present invention.

An example method for producing the carbon nanotube sheet 14 according to the present embodiment is described with reference to FIGS. 10A and 10B. FIG. 10A is a diagram illustrating the twisting step ST21 in the method for producing a carbon nanotube sheet 14 according to the present embodiment, and FIG. 10B is a diagram illustrating the arranging step ST22 in the method for producing a carbon nanotube sheet according to the present embodiment.

As illustrated in FIG. 10A, in the twisting step ST21, the unmodified carbon nanotube 14A having a certain width is drawn with a certain jig from one end portion of the carbon nanotube forest 13 in which the carbon nanotubes 12 stand in rows on the substrate 11, such as a silicon wafer, by a catalytic chemical vapor deposition, for example. The unmodified carbon nanotube sheet 14A that has been drawn is then passed through a metal ring 100 having a diameter smaller than the width of the unmodified carbon nanotube sheet 14A so that the unmodified carbon nanotube sheet 14A is bundled. The bundled unmodified carbon nanotube sheet 14A is then placed on the outer peripheral surface of a rubber roll 102 including a rotating shaft 101, and the rubber roll 102 is caused to perform vibration motion in the axial direction of the rotating shaft 101 to slide the bundled unmodified carbon nanotube sheet 14A on the rubber roll 102. This sliding causes friction, which twists the carbon nanotubes 12 in the bundled unmodified carbon nanotube sheet 14A, thereby providing a ribbon shaped linear assembly of carbon nanotubes 14C in which the carbon nanotubes 12 are assembled together in a fibrous form. The linear assembly of carbon nanotubes 14C is then wound around a bobbin 103.

In the arranging step ST22, an end portion of the linear assembly of carbon nanotubes 14C, twisted into a certain width d and wound around the bobbin 103, is drawn and fixed to an end portion of an adhesive sheet 104 fixed on the outer peripheral surface of the rubber roll 102 with its adhesive surface facing outside. The rubber roll 102 is then rotated to wind the linear assembly of carbon nanotubes 14C fed from the bobbin 103 while being moved at a constant speed in a direction parallel to the axial direction of the rotating shaft 101. In this way, the linear assembly of carbon nanotubes 14C is wound around the rubber roll 102 in such a manner that the linear assembly of carbon nanotubes 14C draws a spiral at substantially equal intervals I. Finally, the adhesive sheet 104 is cut together with the linear assembly of carbon nanotubes 14C along a direction parallel to the axial direction of the rotating shaft 101 of the rubber roll 102, to provide a carbon nanotube sheet 1B that is a conductive sheet including the yarn shaped carbon nanotubes 14C aligned in parallel and fixed on the adhesive sheet 104.

The above embodiment describes an example of producing a carbon nanotube sheet by twisting the carbon nanotube sheet 13. However, a method of producing a carbon nanotube sheet is not limited to the above method. A carbon nanotube sheet may be produced by, for example, performing a spinning step ST21' on the carbon nanotubes 12 instead of the twisting step ST21. Spinning of the carbon nanotubes 12 can be implemented by the producing method described in the specification of United States Patent Application Publication No. 2013/0251619 (Japanese Patent Application Laid-open No. 2012-126635), for example. For spinning the carbon nanotubes 12, for example, the carbon nanotubes 12 are dispersed, by using a surfactant, in a first solvent that contains only water or that is a mixed solvent containing an organic solvent and water, to produce dispersion. The dispersion in which the carbon nanotubes are dispersed is poured into condensate that is a second solvent different from the first solvent, which enables coagulation and spinning of the carbon nanotubes.

With these twisting and spinning methods, the carbon nanotubes 12 contained in a linear assembly are maintained in a state of being mainly aligned in a predetermined direction, and also in the carbon nanotube sheet 14C obtained in the arranging step ST22, the carbon nanotubes are maintained in a state of being mainly aligned in one direction in its surface. During twisting or spinning, some carbon nanotubes 12 may incline toward a direction of twisting or spinning. However, the carbon nanotubes 12 as a whole is mainly directed toward the predetermined direction, and thus provides an effect of increasing conductivity in the predetermined direction.

As described above, according to the embodiment above, the unmodified carbon nanotube sheet 14A is subjected to twisting or spinning to be formed into the linear assembly of carbon nanotube sheet 14C having a certain diameter d in which the carbon nanotubes 12 are assembled together in a fibrous form, and the linear assembly of carbon nanotubes 14C is arranged at certain intervals I to provide the high density portions P1 and the low density portions P2. This structure easily provides a carbon nanotube sheet excellent in light transmittance and conductivity, in which the light transmittance is 70% or more and the resistance is 500 Ω/square or less.

EXAMPLES

The present invention is described below in more detail based on examples and comparative examples performed to clarify the effects of the present invention. The present invention is not limited to the examples and the comparative examples below.

<Measurement of Particle Diameter of Liquid Substance>

The particle diameters of liquid particles sprayed onto a carbon nanotube sheet were measured with an optical microscope (trade name: Ultra-High Magnification USE Microscope CCD SH140CCD-R (3W), manufactured by Shodensha, Inc.). Images of the liquid particles were taken in air at room temperature and were recorded. The particle diameters on the carbon nanotube sheet were measured by analyzing the recorded images. The particle diameter employed the mean of the particle diameters of twenty liquid particles randomly sampled.

<Measurement of Light Transmittance of Carbon Nanotube Sheet>

The light transmittance of the carbon nanotube sheet was measured using optical transmittances obtained with a visible-to-ultraviolet light source (trade name: L10290, manufactured by Hamamatsu Photonics K.K.) and a spectroscope (trade name: USB2000, manufactured by Ocean Optics, Inc.). The intensity of light having a wavelength λ emitted from a light source is indicated with $I_0(\lambda)$, and the intensity of light that had passed through the carbon nanotube sheet is indicated with $I(\lambda)$. Each value of the intensities was measured with the spectroscope. A transmittance $T(\lambda)$ at the wavelength λ was calculated from a ratio $(I/I_0)$ of the light intensities. During the measurement, the optical axis was adjusted so that the light from the light source vertically enters the carbon nanotube sheet. The light transmittance was calculated as the mean of transmittances in a visible light region (380 nm to 760 nm).

<Measurement of Sheet Resistance of Carbon Nanotube Sheet (Conductivity Evaluation)>

The sheet resistance ($R_{sheet}$) of each of the carbon nanotube sheets obtained in the examples and the comparative examples was calculated in the following manner. A resistance value (R) of the carbon nanotube sheet (a distance L between the copper bars=20 mm or 30 mm) was measured with a digital multi-meter (trade name: U1273A, manufactured by Agilent Technologies). The sheet resistance ($R_{sheet}$) was calculated based on a relational expression (1) below based on a width (W) of the carbon nanotube sheet and the distance. The width of the carbon nanotube sheet was calculated from the image analysis of the photograph.

$$R_{sheet} = R \times W/L \qquad \text{Expression (1)}$$

First, in Examples 1 to 7 and Comparative Examples 1 and 2, the inventors of the present invention evaluated light transmittance and conductivity of carbon nanotube sheets produced by the method for producing a carbon nanotube sheet according to the first embodiment described above.

Example 1

(Preparation of Carbon Nanotube Forest)

A carbon nanotube forest was formed on a pre-segmented 6-inch silicon wafer by a catalytic chemical vapor deposition by a thermal chemical vapor deposition (CVD) device including three furnaces in which argon gas was used as a carrier gas and acetylene was used as a carbon source. The height of the carbon nanotube forest was 300 μm.

(Preparation of Carbon Nanotube Sheet)

The edge of the carbon nanotube forest was twisted and was drawn with tweezers to produce a carbon nanotube sheet. The carbon nanotube sheet was seized by its stickiness with two parallel supporting bars (copper bars having a diameter of 2 mm) having a distance between them of 45 mm. The redundant portions of the sheet were cut to obtain a free-standing carbon nanotube sheet stretched between the two supporting bars. The free-standing carbon nanotube sheet stretched between the supporting bars was then transferred onto a jig including two parallel supporting bars (copper bars having a diameter of 2 mm) having a distance between them of 30 mm, at a position between the supporting bars of the jig, to obtain a free-standing carbon nanotube sheet (unmodified carbon nanotube sheet).

(Exposure of Carbon Nanotube Sheet to Aerosol)

An aerosol of ethanol in which air was used as a disperse medium was generated with a supersonic humidifier. The unmodified carbon nanotube sheet in a free-standing state was exposed to the generated aerosol for 1 minute together with the jig. The particle diameter of the ethanol was 15 μm. Subsequently, the unmodified carbon nanotube sheet in a free-standing state was left at room temperature for 1 minute, whereby the carbon nanotubes were assembled together to obtain a modified carbon nanotube sheet. Light transmittance measurement and conductivity evaluation were performed on the unmodified carbon nanotube sheet and the modified carbon nanotube sheet before and after the exposure to the aerosol. Table 1 lists the result.

Example 2

(Stacking of Modified Carbon Nanotube Sheet)

A modified carbon nanotube sheet was obtained in a similar manner to Example 1 except that a jig including two parallel supporting bars (copper bars having a diameter of 2 mm) having a distance between them of 20 mm was used instead of the jig including two parallel supporting bars having a distance between them of 30 mm. Thus obtained modified carbon nanotube sheet is overlaid on a carbon nanotube sheet seized with the jig including two parallel supporting bars having a distance between them of 30 mm, which was obtained in the same manner as Example 1 so that their drawing directions were oriented in the same direction. A stacked assembly was thus obtained in which two of the modified carbon nanotube sheets were stacked. On the obtained stacked assembly, a modified carbon nanotube sheet obtained in the same manner as Example 1 was further stacked, and this operation was repeated. Stacked bodies were thus obtained in which the number of the modified carbon nanotube sheets was 4, 6, 8, 10, and 12, respectively. Light transmittance measurement and conductivity evaluation were performed on these stacked assemblies. Table 1 also lists the result.

Example 3

(Exposure of Stacked Assembly to Aerosol)

The stacked assembly in which twelve of the carbon nanotube sheets had been stacked, which was obtained in Example 2, was exposed to an aerosol in the same manner as Example 1. Subsequently, light transmittance measurement and conductivity evaluation were performed on the stacked assembly. Table 1 also lists the result.

Example 4

A modified carbon nanotube sheet was obtained in a similar manner to Example 1 except that an aerosol of water in which air was used as a disperse medium was used instead of the aerosol of ethanol in which air was used as a disperse medium. The particle diameter of the water was 15 μm. Light transmittance measurement and conductivity evaluation were performed on the unmodified carbon nanotube sheet and the modified carbon nanotube sheet before and after the exposure to the aerosol. Table 1 also lists the result.

Example 5

A modified carbon nanotube sheet was obtained in a similar manner to Example 1 except that an aerosol of isopropyl alcohol (IPA) in which air was used as a disperse medium was used instead of the aerosol of ethanol in which air was used as a disperse medium. The particle diameter of the IPA was 15 μm. Light transmittance measurement and conductivity evaluation were performed on the unmodified carbon nanotube sheet and the modified carbon nanotube sheet before and after the exposure to the aerosol. Table 1 also lists the result.

Example 6

A modified carbon nanotube sheet was obtained in a similar manner to Example 1 except that ethanol was ejected onto a modified carbon nanotube sheet by ink-jet printing with a printer (trade name: Deskjet 1000, manufactured by Hewlett-Packard Development Company, L.P.), instead of the exposure of the unmodified carbon nanotube sheet to the aerosol. The particle diameter of the ethanol was 15 μm. Light transmittance measurement and conductivity evaluation were performed on the unmodified carbon nanotube sheet and the modified carbon nanotube sheet before and after the exposure to the aerosol. Table 1 also lists the result.

Example 7

Carbon nanotube sheets were prepared in the same manner as in Example 1.

(Stacking of Unmodified Carbon Nanotube Sheets and Ejection of Ethanol)

An unmodified carbon nanotube sheet held by a jig in a free-standing state was overlaid on an unmodified carbon nanotube sheet additionally drawn from the carbon nanotube forest so that their drawing directions were oriented in the same direction to obtain a stacked assembly of the unmodified carbon nanotube sheets in which two of the carbon nanotube sheets were stacked. This operation was further repeated to obtain carbon nanotube sheets in which three sheets and four sheets were stacked, respectively. Ethanol was ejected onto the carbon nanotube sheet and the stacked assemblies thereof by ink-jet printing in the same manner as in Example 6 to obtain modified carbon nanotube sheets. Light transmittance measurement and conductivity evaluation were performed on the unmodified carbon nanotube sheets having the corresponding number of layers or their stacked assemblies and the modified carbon nanotube sheets having the corresponding number of layers or their stacked assemblies before and after the ejection of ethanol. Table 1 lists the result.

Comparative Example 1

A modified carbon nanotube sheet formed on a glass plate was obtained in a similar manner to Example 1 except that an unmodified carbon nanotube sheet was attached onto the glass plate as a base, by the adhesive properties of the carbon nanotube sheet itself, instead of seizing the carbon nanotube sheet with the two parallel supporting bars having a distance between them of 30 mm. This modified carbon nanotube sheet was not able to be peeled away from the glass plate without being broken. Light transmittance measurement and conductivity evaluation were performed on the modified carbon nanotube sheet of Comparative Example 1 together with the glass plate having a light transmittance of 100%. Table 1 also lists the result.

Comparative Example 2

A densification process was performed in a similar manner to Example 1 except that 6 μl of ethanol was dropped onto an unmodified carbon nanotube sheet in a free-standing state with a micropipette and was infiltrated thereinto, instead of the exposure of the unmodified carbon nanotube sheet to the aerosol. As a result, the carbon nanotube sheet was broken, and no densification process was able to be performed. In Comparative Example 2, no modified carbon nanotube sheet was obtained, and thus, light transmittance measurement and conductivity evaluation were not performed thereon.

TABLE 1

| | | Firstly modifying step | | | | | |
|---|---|---|---|---|---|---|---|
| | Liquid substance | Liquid contact method | Droplet particle diameter (μm) | Number of stacked layers | Presence or Absence of secondly modifying step | Light transmittance (%) (*3) | Sheet resistance (Ω/square) (*3) |
| Example 1 | Ethanol | Aerosol | 15 | Single layer | Absence | 87 (82) | 1850 (1940) |
| Example 2 | Ethanol | Aerosol | 15 | 2 Layers | Absence | 88 | 933 |
| | Ethanol | Aerosol | 15 | 4 Layers | Absence | 74 | 470 |
| | Ethanol | Aerosol | 15 | 6 Layers | Absence | 60 | 315 |
| | Ethanol | Aerosol | 15 | 8 Layers | Absence | 63 | 254 |
| | Ethanol | Aerosol | 15 | 10 Layers | Absence | 60 | 219 |
| | Ethanol | Aerosol | 15 | 12 Layers | Absence | 57 | 194 |
| Example 3 | Ethanol | Aerosol | 15 | 12 Layers | Presence (*2) | 83 | 189 |
| Example 4 | Water | Aerosol | 15 | Single layer | Absence | 74 (69) | 831 (888) |
| Example 5 | IPA | Aerosol | 15 | Single layer | Absence | 93 (65) | 787 (1079) |
| Example 6 | Ethanol | Ink-jetting | 15 | Single layer | Absence | 95 (82) | 1833 (1860) |
| Example 7 | Ethanol | Ink-jetting | 15 | Single layer | Absence | 88 (70) | 847 (1096) |
| | Ethanol | Ink-jetting | 15 | 2 Layers (*1) | Absence | 75 (53) (*4) | 363 (456) (*4) |
| | Ethanol | Ink-jetting | 15 | 3 Layers (*1) | Absence | 58 (41) (*4) | 317 (383) (*4) |
| | Ethanol | Ink-jetting | 15 | 4 Layers (*1) | Absence | 41 (32) (*4) | 219 (320) (*4) |
| Comparative Example 1 | Ethanol | Aerosol (On base) | 15 | Single layer | Absence | 68 (65) | 629 (727) |
| Comparative Example 2 | Ethanol | Dropping (Free-standing) | — | Single layer | Absence | — | — |

(*1) Unmodified carbon nanotube sheets were stacked before the firstly modifying step, and then, the firstly modifying step was performed thereon.
(*2) The condition at the secondly modifying step is the same as that at the firstly modifying step in Example 1.
(*3) The values in (parentheses) are values measured before the firstly modifying step was performed.
(*4) The values in (parenthesis) are values of the stacked sheets that had been measured before the firstly modifying step was performed.

As is apparent from Table 1, the modified carbon nanotube sheets modified by a densification process in which they were brought into contact with either one of or both of vapor and liquid particles of a liquid substance in a free-standing state of being drawn from the carbon nanotube forest are excellent in both light transmittance and conductivity evaluation (Examples 1 and 4 to 6). This effect was obtained also in a case where a densification process was performed after the unmodified carbon nanotube sheets were stacked (Example 7). Comparison of Example 4 with Example 5 reveals that although the light transmittances before the firstly modifying step were almost equal, the light transmittance of Example 5 obtained after the organic solvent was used at the firstly modifying step largely increased. In Example 2, as the number of layers of the stacked modified carbon nanotube sheets increased, the resistances and the light transmittances of the stacked assemblies decreased. In Example 3 in which the secondly modifying step was further performed on the stacked assembly, the light transmittance prominently increased as compared with that in Example 2 in which no secondly modifying step was performed. Despite that the number of stacked layers of the stacked assembly of the carbon nanotube sheets of Example 3 was larger than that of any of the stacked assemblies obtained in Example 7, the stacked assembly had high light transmittance. The stacked assembly also had high conductivity as a result of the increase in the number of stacked layers.

By contrast, it is apparent that when the carbon nanotube sheet arranged on the base was subjected to a densification process, the light transmittance and the conductivity evaluation were significantly worse than that in Example 1 (Comparative Example 1). It is contemplated that this result is due to insufficient densification process. This is because, the movement of the carbon nanotubes was inhibited due to the interaction between the base and the carbon nanotube sheet arranged on the base. In addition, it is apparent that when the carbon nanotube sheet was infiltrated into droplets of a liquid substance, no modified carbon nanotube sheet was obtained (Comparative Example 2). It is contemplated that this result is caused because the unmodified carbon nanotube sheet failed to keep the free-standing state due to infiltration into the liquid substance and was broken.

Second, in Examples 8 to 10 and Reference Example 1, the inventors evaluated light transmittance and conductivity of carbon nanotube sheets produced by the method for producing a carbon nanotube sheet according to the second embodiment described above.

Example 8

A carbon nanotube forest having a height of 300 μm was obtained on a silicon wafer having a width of 50 mm by a catalytic chemical vapor deposition by a CVD device including three furnaces in which argon gas was used as a carrier gas and acetylene was used as a carbon source.

An end portion of the obtained carbon nanotube forest was pinched and a carbon nanotube sheet having a width of 7 mm was drawn. The drawn carbon nanotube sheet was then passed through a metal ring having a diameter of 5 mm so that the carbon nanotube sheet is bundled. The bundled carbon nanotube sheet was placed on a rubber roll having a diameter of 3 cm, and the rubber roll was caused to perform vibration motion in the axial direction of the roll to slide the bundled carbon nanotube sheet on the rubber roll. This sliding caused friction, which twisted the bundled carbon nanotube sheet into a ribbon shape, and the twisted ribbon shaped linear assembly of carbon nanotubes was wound around a bobbin. In this way, the drawing of the carbon nanotube sheet from the carbon nanotube forest, the bundling of the carbon nanotube sheet, the twisting of the carbon nanotubes, and the winding of the linear assembly of carbon nanotubes were successively performed.

A removable adhesive sheet (manufactured by MeCanimaging, trade name: MTAR) was then wrapped around and fixed on the outer peripheral surface of the rubber roll with its adhesive surface facing outside preventing the removable adhesive sheet from wrinkling up.

An end portion of the linear assembly of carbon nanotubes was then attached to the adhesive surface at a position close to an end portion of the rubber roll. Subsequently, the linear assembly of carbon nanotubes was fed, and wound by the rubber roll being rotated while the rubber roll was gradually moved at a constant speed in a direction parallel to the axial direction of the roll, and the linear assembly of carbon nanotubes was wound around the rubber roll in such a manner that the linear assembly of carbon nanotubes draws a spiral at equal intervals. The adhesive sheet was then cut together with the linear assembly of carbon nanotubes along a direction parallel to the axial direction of the rubber roll, to provide a conductive sheet including the linear assembly of carbon nanotubes aligned in parallel and fixed on the adhesive sheet. The diameter d of the linear assembly was 20 μm, and the interval l between the aligned linear assemblies was 1700 μm. Table 2 lists the result.

Example 9

A conductive sheet was produced in the same manner as in Example 8 except that the linear assembly of carbon nanotubes was wound around the rubber roll such that the interval l between the linear assemblies is 800 μm. Table 2 lists the result.

Example 10

A conductive sheet was produced in the same manner as in Example 8 except that the linear assembly of carbon nanotubes was wound around the rubber roll such that the interval l between the linear assemblies is 200 μm. Table 2 lists the result.

Reference Example 1

A conductive sheet was produced in the same manner as in Example 8 except that the linear assembly of carbon nanotubes was wound around the rubber roll such that the interval l between the linear assemblies is 10 μm. Table 2 lists the result.

TABLE 2

|  | Yarn diameter d (μm) | Width of yarn interval (μm) | Light transmittance (%) | Sheet resistance (Ω/square) |
| --- | --- | --- | --- | --- |
| Example 8 | 20 | 1700 | 93 | 470 |
| Example 9 | 20 | 800 | 86 | 100 |
| Example 10 | 20 | 200 | 82 | 25 |
| Reference Example 1 | 20 | 10 | 18 | 1.3 |

As is apparent from Table 2, the carbon nanotube sheets that are excellent in light transmittance and sheet resistance were each obtained by providing the high density portions and the low density portions by arranging, at certain intervals, the linear assembly of carbon nanotubes obtained by twisting the unmodified carbon nanotube sheet (Examples 8 to 10). From this result, it is contemplated that the conductivity increases because of the high density portions and the light transmittance increases because of the low density portions.

The invention claimed is:

1. A method for producing a carbon nanotube sheet, the method comprising:
   firstly modifying of modifying a free-standing unmodified carbon nanotube sheet in which a plurality of carbon nanotubes are aligned in a predetermined direction, wherein the firstly modifying includes
   performing a densification process of bringing the unmodified carbon nanotube sheet into contact with liquid particles of mist of a liquid substance to produce a modified carbon nanotube sheet that contains the carbon nanotubes which are mainly aligned in a predetermined direction, and that includes a high density portion where the carbon nanotubes are assembled together and a low density portion where density of the carbon nanotubes is relatively lower than density in the high density portion,
   wherein at least one layer of the unmodified carbon nanotube sheet is further stacked on at least one layer of the modified carbon nanotube sheet,
   wherein a first orientation direction of the carbon nanotubes of the at least one unmodified carbon nanotube sheet and a second orientation direction of the carbon nanotubes of the at least one modified carbon nanotube sheet are oriented in substantially the same direction, whereby substantially the same direction includes displacements between the first orientation direction and the second orientation direction within a range of 15° or smaller,
   wherein the liquid particles have a size of 200 μm or smaller, and
   wherein the liquid particles are formed as either one of or both of an aerosol of the liquid substance and the liquid substance ejected by ink-jetting.

2. A method for producing a carbon nanotube sheet, the method comprising:
   firstly modifying of modifying a free-standing unmodified carbon nanotube sheet in which a plurality of carbon nanotubes are aligned in a predetermined direction, wherein the firstly modifying includes performing a densification process of bringing the unmodified carbon nanotube sheet into contact with liquid particles of mist of a liquid substance to produce a modified carbon nanotube sheet that contains the carbon nanotubes which are mainly aligned in a predetermined direction, and that includes a high density portion where the carbon nanotubes are assembled together and a low density portion where density of the carbon nanotubes is relatively lower than density in the high density portion; and
   stacking at least two layers of the modified carbon nanotube sheets to prepare a stacked assembly of the carbon nanotube sheets,
   wherein a first orientation direction of the carbon nanotubes of at least one modified carbon nanotube sheet and a second orientation direction of the carbon nanotubes of at least one modified carbon nanotube sheet are oriented in substantially the same direction, whereby substantially the same direction includes displacements between the first orientation direction and the second orientation direction within a range of 15° or smaller, wherein the liquid particles have a size of 200 μm or smaller, and wherein the liquid particles are formed as either one of or both of an aerosol of the liquid substance and the liquid substance ejected by ink-jetting.

3. The method for producing a carbon nanotube sheet according to claim 2, wherein at the stacking step, the stacked assembly of the carbon nanotube sheets is prepared by stacking 2 to 25 layers of the modified carbon nanotube sheets.

4. The method for producing a carbon nanotube sheet according to claim 1, wherein the liquid substance is an organic solvent.

5. The method for producing a carbon nanotube sheet according to claim 4, wherein the organic solvent is an alcohol compound.

6. The method for producing a carbon nanotube sheet according to claim 5, wherein the alcohol compound is at least one selected from the group consisting of methanol, ethanol, and isopropyl alcohol.

7. A carbon nanotube sheet produced by the method for producing a carbon nanotube sheet according to claim 1.

8. The carbon nanotube sheet according to claim 7, wherein the carbon nanotube sheet has a light transmittance of 70% or more.

9. The carbon nanotube sheet according to claim 7, wherein the carbon nanotube sheet has a resistance of 500 Ω/square or less.

10. The carbon nanotube sheet according to claim 9, wherein the carbon nanotube sheet has the light transmittance of 70% or more and a resistance of 500 Ω/square or less.

11. The method for producing a carbon nanotube sheet according to claim 1, further comprising:
secondly modifying the stacked assembly by a densification process in which the stacked assembly is brought into contact with liquid particles of the liquid substance.

12. The method for producing a carbon nanotube sheet according to claim 1, wherein the free-standing unmodified carbon nanotube sheet comprises at least two unmodified carbon nanotube sheets stacked on each other prior to the modifying.

13. The method for producing a carbon nanotube sheet according to claim 2, further comprising:
secondly modifying the stacked assembly by a densification process in which the stacked assembly in a free-standing state is brought into contact with liquid particles of the liquid substance.

* * * * *